US007109630B2

(12) United States Patent
Maeda et al.

(10) Patent No.: US 7,109,630 B2
(45) Date of Patent: Sep. 19, 2006

(54) ELECTRIC ROTATING MACHINE AND MANUFACTURING PROCESS THEREOF

(75) Inventors: Naohide Maeda, Tokyo (JP); Yoshihito Asao, Tokyo (JP); Masahiko Fujita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/991,480

(22) Filed: Nov. 19, 2004

(65) Prior Publication Data

US 2005/0110358 A1    May 26, 2005

(30) Foreign Application Priority Data

Nov. 25, 2003  (JP) ............................. 2003-393239

(51) Int. Cl.
*H02K 1/22*    (2006.01)
(52) U.S. Cl. ............. 310/263; 310/156.72; 310/156.73
(58) Field of Classification Search ............... 310/261, 310/263, 181, 156.66–156.73
See application file for complete search history.

(56) References Cited

U.S. PATENT DOCUMENTS

| 5,907,209 A | 5/1999 | Ishida | |
| 5,969,459 A * | 10/1999 | Taniguchi et al. | 310/263 |
| 6,150,746 A * | 11/2000 | Lechner | 310/181 |
| 6,333,582 B1 | 12/2001 | Asao et al. | |
| 6,369,485 B1 | 4/2002 | Oohashi et al. | |
| 2002/0011757 A1 | 1/2002 | Tanaka et al. | |
| 2004/0100162 A1* | 5/2004 | Maeda et al. | 310/263 |
| 2004/0135464 A1* | 7/2004 | Morikaku et al. | 310/263 |

FOREIGN PATENT DOCUMENTS

| JP | 2865091 B2 | 12/1998 |
| JP | 3144567 B2 | 1/2001 |
| JP | 2001-78374 A | 3/2001 |
| JP | 2001-197712 A | 7/2001 |

\* cited by examiner

*Primary Examiner*—Thanh Lam
(74) *Attorney, Agent, or Firm*—Sughrue Mion, PLLC

(57) ABSTRACT

In an electric rotating machine, a rotor can be manufactured relatively easily at reasonable cost without high working accuracy for pole cores, and a permanent magnet can be assembled without impairing cooling efficiency of the rotor. A magnet-holding member 7 is separately fixed to a claw-shaped magnetic pole 21 of at least one of a pair of pole cores 2, 3; each magnet-holding member 7 is provided with a magnet mounting part 72 on which a permanent magnet 5 is mounted on two sides of the claw-shaped magnetic pole 21 in circumferential direction; and each magnet mounting part 72 is formed so as to be located between the claw-shaped magnetic poles 21, 31 engaged with each other.

6 Claims, 5 Drawing Sheets

ELECTRIC ROTATING MACHINE AND MANUFACTURING PROCESS THEREOF

BACKGROUND OF THE INVENTION

1. Field of the Invention

The present invention relates to an electric rotating machine having a rotor provided with plural permanent magnets, and to a manufacturing method of the electric rotating machine.

2. Description of the Related Art

In a rotor of the conventional electric rotating machines, to facilitate adjustment of magnetic flux amount, a number of claw-shaped magnetic poles covering a rotor coil disposed at a predetermined pitch along the circumferential direction form a pair of pole cores, and the pairs of pole cores are oppositely disposed so that the mentioned claw-shaped magnetic poles are engaged with each other, thus a rotor core being formed.

In the electric rotating machine of this type, a current is applied to a rotor coil to magnetize the pole core. To operate as a generator, a rotating force is applied from outside such as engine to the rotor thereby causing a stator coil to generating an electromotive force. To operate as a motor, a voltage is applied to each of ac terminals of the stator thereby causing the rotor to rotate.

Output of the electric rotating machine in that case relates to an amount of magnetic flux generated in the rotor. That is, main magnetic flux generated by the rotor coil runs through the claw-shaped magnetic poles of the pole core, passing through the stator disposed outside of the pole core, and comes to an adjacent claw-shaped magnetic pole. In this process, in the structure just by engaging the claw-shaped magnetic poles with each other, there exists leakage flux flowing from the side or inner circumferential face thereof to the adjacent claw-shaped magnetic pole. Such leakage flux does not interlink to the stator, and therefore effective magnetic flux amount is reduced, resulting in lowering the output of the electric rotating machine.

To overcome such a disadvantage and improve output of the electric rotating machine, an idea has been heretofore proposed. In this idea, to suppress occurrence of the leakage flux, a permanent magnet is inserted between the claw-shaped magnetic poles adjacent each other along the circumferential direction of the rotor. For example, in the Japanese Patent No.2865091, an annular magnet-holding member formed along the circumferential direction with a recess, into which each claw-shaped magnetic pole of the pole core is fitted, is disposed, and a permanent magnet is held in this magnet-holding member circumferentially at a predetermined pitch, thus forming an assembly. This assembly is mounted on the pole.

In the Japanese Patent No.3144567, another known art is disclosed, and in which each claw-shaped magnetic pole of the pole core is provided with a flange, and combining each pole core forms a magnet fixing part consisting of a pair of flanges. A permanent magnet is inserted into the magnet fixing part from an opening located in axial direction. In addition, a plate is attached before and behind the rotor to prevent the permanent magnet from getting out of the opening of the magnet fixing part.

However, in the former known art as disclosed in the Japanese Patent No.2865091, since a recess into which each claw-shaped magnetic pole of the pole core is inserted is formed along the circumferential direction of the annular magnet holding member, it is essential to minimize a difference between one claw-shaped magnetic pole and another. If there remains any variation between the claw-shaped magnetic poles, it will be impossible to exactly fit the claw-shaped magnetic poles into each recess of the magnet-holding member. In other words, high working accuracy is required in each of the claw-shaped magnetic poles. Therefore it is actually impossible to completely finish the pole core only by forging and it is necessary to apply cutting in order to improve the working accuracy, which results in not only taking much labor but also increase in cost.

Moreover, because of a centrifugal force produced by the rotation of the rotor and applied to the magnet-holding member, it is necessary for the magnet-holding member to have strength to a certain extent. A soft material such as resin easy to mold will be deficient in strength. To cope with this, any material obtained by press working such as spring steel will be essential as the magnet-holding member. However, it is a difficult work configuring a magnet-holding member into an annular shape having recesses, in which the claw-shaped magnetic poles are inserted, along the circumferential direction, which eventually results in much increase in cost.

In the latter known art as disclosed in the Japanese Patent No.3144567, each claw-shaped magnetic pole of the pole core is provided with a flange for mounting a permanent magnet. However, it is difficult to provide the claw-shaped magnetic pole with a flange just by forging, and it is necessary to apply cutting and shaping after assembling. As a result, the pole core becomes expensive.

Moreover, plates are attached before and behind the rotor to prevent the permanent magnet from getting out of the opening of the magnet fixing part. It is certain that the plates are effective in view of preventing the permanent magnet from getting out of, but the plates inhibit the airflow in the vicinity of the rotor. As a result, cooling efficiency of the rotor is lowered resulting in negative affect on the permanent magnet due to heat.

The present invention was made to solve the above-discussed problems and has an object of providing an electric rotating machine capable of preventing effectively generation of leakage flux, manufacturing the rotor relatively easy at reasonable cost without high working accuracy of the pole core and the permanent magnet, and assembling the permanent magnet without negative affect on the cooling efficiency of the rotor. The invention also provides a manufacturing method of such an electric rotating machine.

SUMMARY OF THE INVENTION

To accomplish the foregoing objects, an electric rotating machine according to the present invention includes a rotor having a rotor core and a rotor coil magnetizing the rotor core, and in which the mentioned rotor core is arranged such that a number of claw-shaped magnetic poles covering the mentioned rotor coil are oppositely disposed so that a pair of pole cores formed at a predetermined pitch along circumferential direction are engaged with each other. A magnet-holding member is separately fixed to each of the claw-shaped magnetic poles of at least one of the mentioned pair of pole cores. Each magnet holding member is provided with a magnet mounting part on which a permanent magnet is mounted on two sides of the claw-shaped magnetic poles in circumferential direction, and each magnet mounting part is formed so as to be located between the claw-shaped magnetic poles engaged with each other.

In the above arrangement, the mentioned magnet-holding member is preferably fixed to each claw-shaped magnetic pole of both of the two pole cores. Further, it is preferable that the mentioned magnet-holding member is fixed to the claw-shaped magnetic pole by at least one of welding, caulking or adhesion. Furthermore, the mentioned magnet-holding member is preferably composed of spring steel.

A manufacturing method of an electric rotating machine according to the invention includes the steps of: fixing separately a magnet holding member, in which a magnet mounting part for mounting a permanent magnet is formed on two sides of each of claw-shaped magnetic poles in circumferential direction, to the mentioned each of the claw-shaped magnetic poles of at least one of a pair of pole cores formed at a predetermined pitch along circumferential direction covering a rotor coil; mounting a permanent magnet on the mentioned magnet mounting part; and engaging the pair of pole cores with each other so that the magnet mounting part, on which the permanent magnet is mounted, is located between the claw-shaped magnetic poles where the pair of pole cores are adjacent. Another manufacturing method of an electric rotating machine according to the invention includes the steps of: engaging claw-shaped magnetic poles of a pair of pole cores with each other so that a magnet mounting part is located between the claw-shaped magnetic poles adjacent each other; and mounting a permanent magnet on the mentioned magnet mounting part.

In the electric rotating machine of above arrangement according to the invention, since a magnet-holding member is separately mounted on each of the claw-shaped magnetic poles, configuration of the magnet holding part is simple and can be manufactured at reasonable cost. Further, a permanent magnet can be exactly mounted and held without high working accuracy of the pole core and the permanent magnet. Therefore, any cutting of the pole core is not required but forging thereof is sufficient, resulting in manufacture at reasonable cost as a whole. In addition, to mount the permanent magnet on the magnet mounting part of the magnet holding member, it is possible to bend the magnet holding member and/or charge with any adhesive, in which case the permanent magnet can be more firmly fixed to the magnet mounting part. Further, in the case of mounting the permanent magnet by bending the magnet-holding member, replacement of the permanent magnet can be carried out by unbending the bent part.

In the case of fixing the mentioned magnet-holding member to each claw-shaped magnetic pole of the two pole cores, the permanent magnet can be shaped conforming to the shape of the side face of each of the claw-shaped magnetic poles. As a result, leakage flux from between the claw-shaped magnetic poles can be efficiently prevented by the permanent magnet. Further, any part not useful for the prevention of leakage flux can be omitted, and therefore cost of materials can be reduced. Furthermore, since each individual permanent magnet can be small-sized, centrifugal force applied to each permanent magnet becomes small, thus durability of the rotor being improved.

When fixing the magnet-holding member to the claw-shaped magnetic poles by welding, fixation strength becomes larger and exact fixation is achieved. When fixing by caulking, the fixation is easy and less expensive. Further, when fixing by adhesion, the magnet holding member and the pole cores can be fixed without thermal deformation, and fatigue strength is improved. In the case of composing the magnet-holding member of spring steel, strength and durability to vibration can be improved.

In the manufacturing method of an electric rotating machine according to the invention including the steps of: fixing separately a magnet holding member, in which a magnet mounting part for mounting a permanent magnet is formed on two sides of each of claw-shaped magnetic poles in circumferential direction, to the mentioned each of the claw-shaped magnetic poles of at least one of a pair of pole cores; mounting a permanent magnet on the mentioned magnet mounting part; and engaging the pair of pole cores with each other so that the magnet mounting part, on which the permanent magnet is mounted, is located between each of the claw-shaped magnetic poles where the pair of pole cores are adjacent, any small manufacturing equipment is sufficient for inserting the permanent magnet into the pole cores. Even in the case of inserting the permanent magnet into the two pole cores, any special new equipment is not required, resulting in low manufacturing cost.

Further, in the manufacturing method of an electric rotating machine according to the invention including the steps of: engaging claw-shaped magnetic poles of a pair of pole cores with each other so that a magnet mounting part is located between the claw-shaped magnetic poles adjacent each other; and mounting a permanent magnet on the mentioned magnet mounting part, it is possible to prevent the permanent magnet from being direct application of any pressing force at the moment of engaging the claw-shaped magnetic poles with each other and/or at the moment of press-fitting a shaft in the rotor core assembled with the pole cores. As a result, the permanent magnet is exactly prevented from being damaged. Furthermore, it is also possible to reduce the possibility of mixing foreign matters such as chip or powder due to cutting.

DETAILED DESCRIPTION OF THE INVENTION

Figure 1:
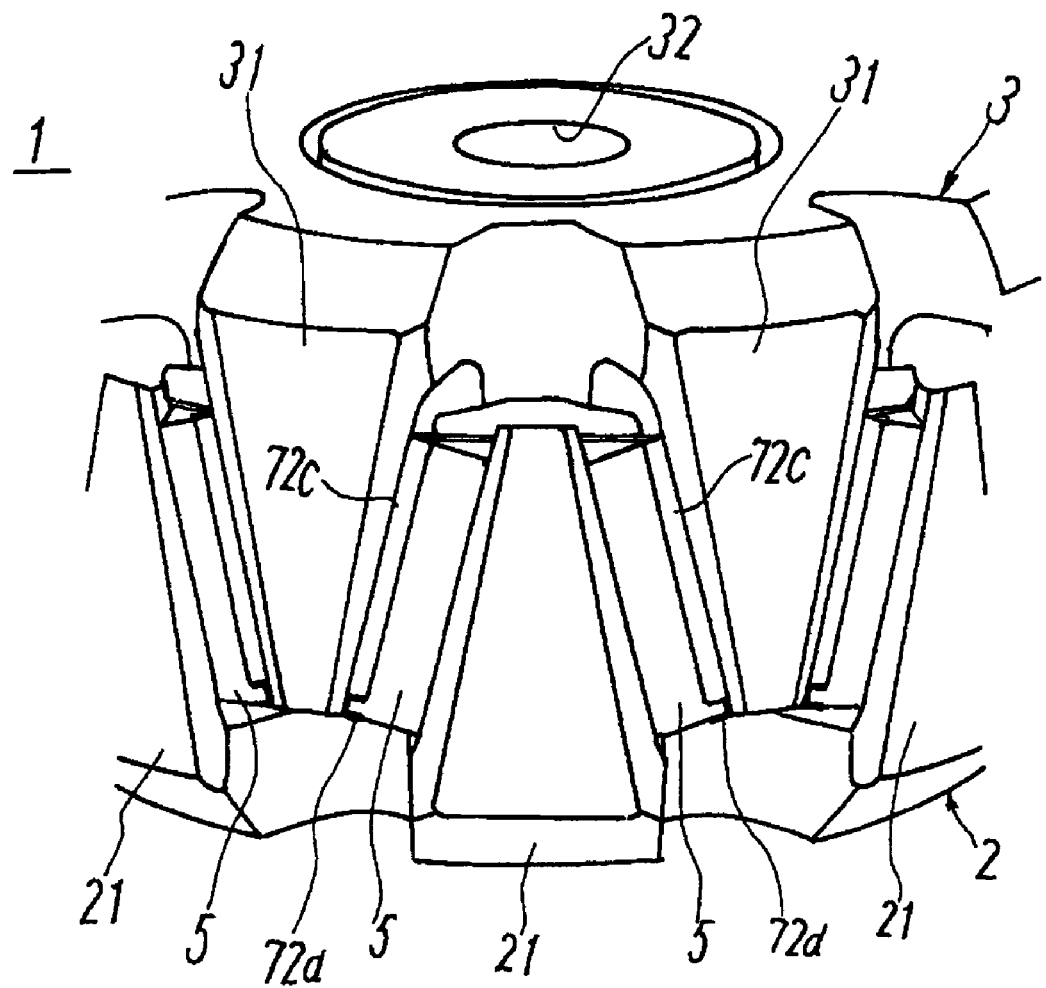
FIG. 1 is a perspective view showing a structure of a rotor of an electric rotating machine according to Embodiment 1 of the present invention.

Referring now to FIGS. 1, 2, 3 and 4, an electric rotating machine according to this Embodiment 1 includes a rotor core 1 forming a rotor, and a rotor coil (not shown) for magnetizing the rotor core 1.

The rotor core 1 is provided with a pair of pole cores 2, 3. On the outer periphery of each of the pole cores 2, 3, a number of claw-shaped magnetic poles 21, 31 covering the rotor coil are formed at a predetermined pitch along the circumferential direction. Each of the pole cores 2, 3 is oppositely disposed so that the claw-shaped magnetic poles 21, 31 are engaged with each other. In addition, reference numeral 32 indicates an insertion hole provided at the center part of one pole core for insertion of the rotary shaft.

Figure 2:
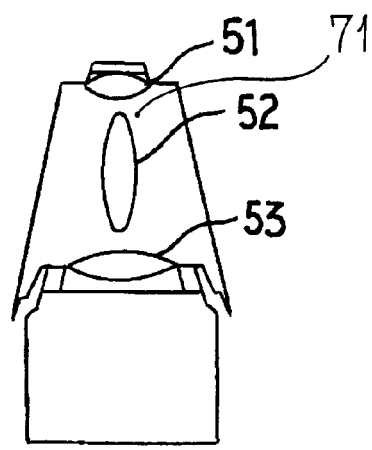
FIG. 2 is a front view showing a state of mounting a magnet-holding member on a claw-shaped magnetic pole of a pole core.

In this Embodiment 1, a magnet holding member 7 for holding the permanent magnet 5 on the inside thereof is fixed to each claw-shaped magnetic pole 21 of one pole core 2 of the two pole cores 2, 3 by laser welding or projection welding. In addition, as shown in FIG. 2, the laser welding or projection welding is preferably applied to all or any of the parts indicated by reference numerals 51 to 53.

Working a plate of spring steel forms the magnet-holding member 7. For example, a stainless steel of 0.5 to 0.8 mm in thickness (such as SUS301, SUS304 or SUS631) or tool steel (such as SK material) is preferably employed as the magnet-holding member 7. By employing such a material, the magnet holding-member 7 can maintain a sufficient strength to the centrifugal force of the permanent magnet 5 and improve the durability. Further, it is easy to improve the output just by reducing a gap between the rotor and the stator.

Each magnet-holding member 7 is provided with a mounting part 71 fixed to the claw-shaped magnetic pole 21, and two magnet-mounting parts 72 formed from this mounting part 71 on two sides of the claw-shaped magnetic pole 21 in circumferential direction. A permanent magnet 5 composed of neodymium or the like is mounted on each of the magnet mounting parts 72.

Each magnet mounting part 72 is formed so as to be located between the claw-shaped magnetic poles 21, 31 engaging with each other. Each magnet mounting part 72 has an extending part 72a extending left and right by the thickness of the permanent magnet 5 in circumferential direction of the claw-shaped magnetic poles 21, a holding part 72b bent from the extending part 72a along the left and right sides of the claw-shaped magnetic poles 21, a stopper part 72c bent inwardly the edge along the ridgeline of the holding part 72b, and a projecting stopper piece 72d bent from one end of the holding part 72b in axial direction toward the side face of the claw-shaped magnetic poles 21.

Figure 3:
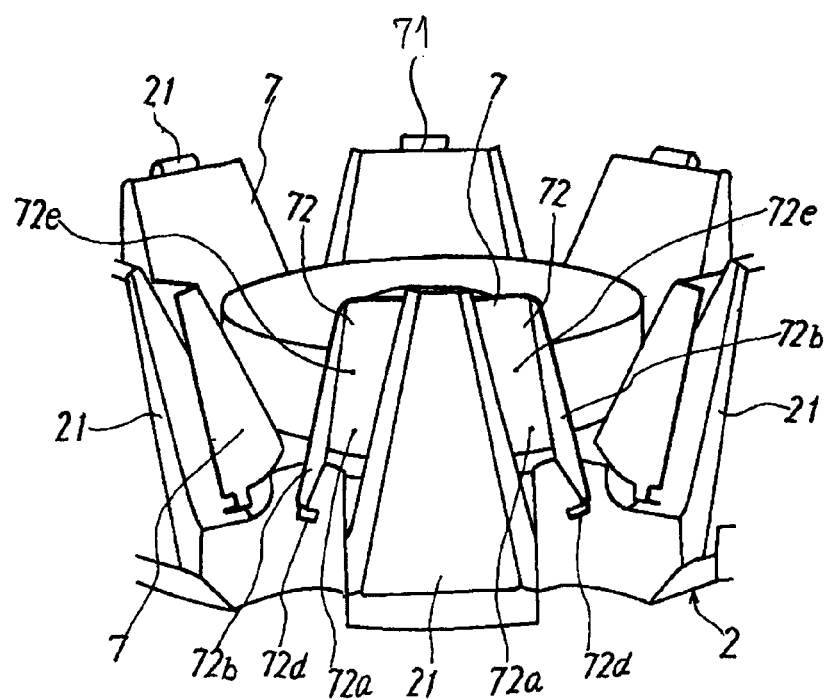
FIG. 3 is a perspective view showing a state of mounting magnet-holding members on claw-shaped magnetic poles of the pole core.
Figure 4:
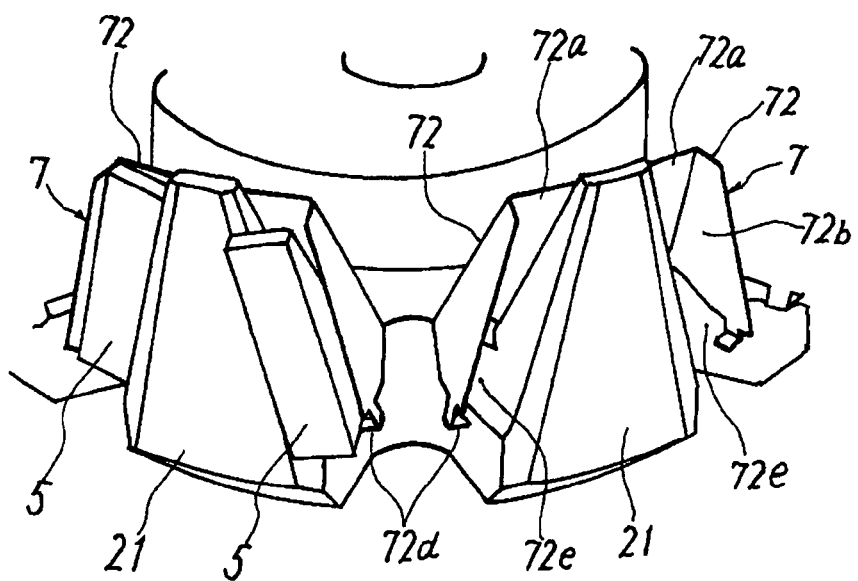
FIG. 4 is a perspective view showing a state of mounting permanent magnets on magnet mounting parts of the magnet-holding members.
Figure 5:
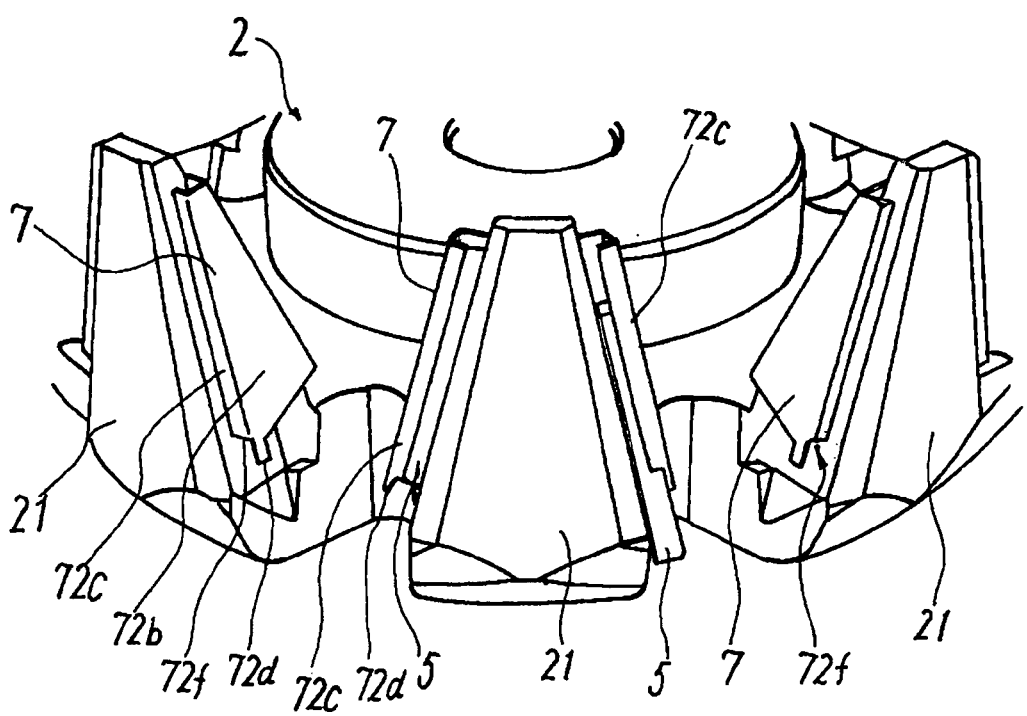
FIG. 5 is a perspective view showing a modification of assembling order of the permanent magnets on the magnet mounting parts of the magnet-holding members.

A pair of pole cores 2, 3 is assembled as follows. First, as shown in FIGS. 2 and 3, the mounting part 71 of the magnet-holding member 7 is separately fixed to inside of each claw-shaped magnetic poles 21 of one pole core 2 by laser welding or projection welding. At this stage, the edge along the ridgeline of the holding part 72b has not been bent, and the stopper part 72c is not yet formed. Accordingly, an opening part 72e for insertion of permanent magnet is formed on the outside of each magnet mounting part 72. Then, as shown in FIG. 4, the permanent magnet 5 is fixed inserted to each magnet mounting part 72 through the opening part 72e. At this time, the permanent magnet 5 is positioned by coming in contact with the projecting stopper piece 72d.

Subsequently, bending inwardly the edge along the ridgeline of the holding part 72b forms the stopper part 72c, whereby the permanent magnet 5 is exactly fixed in the state of being enclosed by the magnet mounting part 72. Thereafter, each claw-shaped magnetic pole 31 of the other pole core 3 is inserted between respective magnet mounting parts 72 adjacent each other in the magnet-holding member 7, whereby the claw-shaped magnetic poles 21, 31 of the respective pole cores 2, 3 are engaged with each other.

As a result, since the permanent magnet 5 mounted on the magnet mounting part 72 of the magnet-holding member 7 is interposed between the claw-shaped magnetic poles 21, 31 engaged with each other, it is possible to suppress the generation of magnetic flux flowing between the claw-shaped magnetic poles 21, 31, thereby output of the electric rotating machine being improved.

In this manner, according to this Embodiment 1, since a magnet-holding member 7 is separately mounted on the claw-shaped magnetic poles 21 of one pole core 2 forming the rotor, configuration of the magnet holding member 7 is simple and can be manufactured at reasonable cost. Further, since the magnet holding member 7 being formed by bending a plate material can be elastically deformed to a certain extent, the permanent magnet 5 can be exactly mounted and held without high working accuracy of the pole cores 2, 3 and the permanent magnet 5. Therefore, any cutting of the pole cores 2, 3 is not required but forging thereof is sufficient, resulting in manufacture at reasonable cost as a whole.

Further, since the permanent magnet 5 is mounted on the magnet mounting part 72 after fixing the magnet-holding member 7 to each claw-shaped magnetic poles 21, it is possible to prevent the permanent magnet 5 from any disadvantage such as being unexpectedly damaged at the time of laser welding or projection welding of the permanent magnet 5. Furthermore, since the magnet mounting part 72 of the magnet-holding member 7 and the permanent magnet 5 are located only on the upper part between the claw-shaped magnetic poles 21, 31 engaging with each other, airflow through inside of the rotor is secured. As a result, the rotor is maintained by desirable cooling.

Although the stopper part 72c is formed by bending the edge of the holding part 72b after mounting the permanent magnet 5 on each magnet mounting part 72 of the magnet-holding member 7 in the foregoing description, it is also preferable that the projecting stopper piece 72d is preliminarily formed before fixing the magnet-holding member 7 to the claw-shaped magnetic pole 21, while providing the opening part 72f for insertion of the permanent magnet on the base side of the claw-shaped magnetic pole 21 by forming the projecting stopper piece 72d and the holding part 72b to be flush.

In such an arrangement, after fixing the magnet-holding member 7 to the claw-shaped magnetic pole 21, the permanent magnet 5 is inserted through the opening part 72f, and then the projecting stopper piece 72d is bent toward each side face of the magnet-holding member 7 to the claw-shaped magnetic pole 21 and the permanent magnet 5 is fixed to the magnet mounting part 72.

As described above, bending the projecting stopper piece 72d after inserting the permanent magnet 5 through the opening part 72f of the magnet mounting part 72 is easy as compared with forming the stopper part 72c by bending the edge of the holding part 72b, it is possible to reduce labor at the time of mounting the permanent magnet 5 on each magnet mounting part 72.

EMBODIMENT 2

Figure 6:
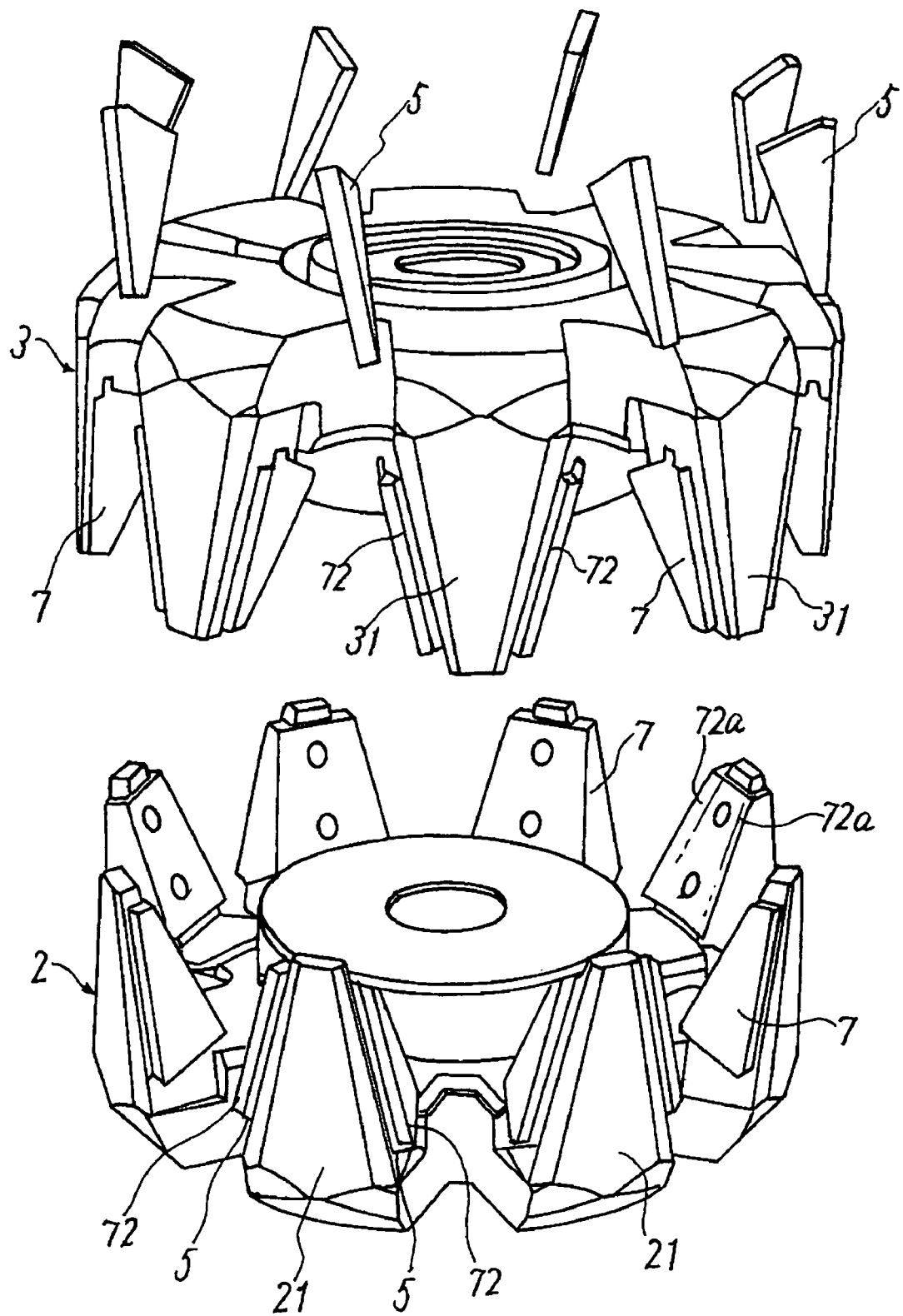
FIG. 6 is a perspective view showing a structure of a rotor of an electric rotating machine according to Embodiment 2 of the invention.

FIG. 6 is a perspective view showing a structure of a rotor of an electric rotating machine according to Embodiment 2 of the invention, and in which the same reference numerals indicates the same or like parts corresponding to the foregoing Embodiment 1 shown in FIGS. 1 to 3.

This Embodiment 2 is characterized in that the magnet-holding member 7 is fixed to each of the claw-shaped magnetic poles 21, 31 of the pair of pole cores 2, 3. Arrangement of the magnet-holding member 7 is basically the same as in the foregoing Embodiment 1.

However, in this Embodiment 2, width of the extending part 72a of each magnet mounting part 72 in circumferential direction is not larger than a half of that in the foregoing Embodiment 1. Accordingly, thickness of the permanent magnet 5 is also not larger than a half of that in the foregoing Embodiment 1, and the permanent magnet 5 is shaped conforming to the side face of each of the claw-shaped magnetic poles 21, 31. Accordingly, at the time of preparing a rotor core 1, the magnet-holding members 7 respectively fixed to the claw-shaped magnetic poles 21, 31 are engaged with each other and the pair of pole cores 2, 3 are assembled.

In the arrangement in which the magnet-holding member 7 is fixed to both of claw-shaped magnetic poles 21, 31 of the two pole cores 2, 3, shape of each permanent magnet 5 can be formed conforming to the side face of each of the claw-shaped magnetic poles 21, 31, leakage flux from between the claw-shaped magnetic poles 21, 31 can be efficiently prevented by the permanent magnet 5. Further, any part not useful for the prevention of leakage flux can be omitted, and therefore material cost of the permanent magnet 5 can be reduced. Furthermore, since each individual permanent magnet 5 can be small-sized, centrifugal force applied to each permanent magnet 5 becomes small, thus durability of the rotor being improved.

Also in this Embodiment 2, by bending the projecting stopper piece 72d after inserting the permanent magnet 5 through the opening part 72f on the base side of the claw-shaped magnetic poles 21, 31 of the magnet mounting part 72, it is possible to reduce labor at the time of mounting the permanent magnet 5 on each magnet mounting part 72.

The other features, functions and advantages of this Embodiment 2 are the same as in the foregoing Embodiment 1, and further detailed description thereof is omitted herein.

As for the foregoing Embodiments 1 and 2, following variations and modifications may be made without departing from the scope of the invention.

(1) In the foregoing Embodiments 1 and 2, the stopper piece 72c is formed by bending inwardly a part of the magnet-holding member 7, or the permanent magnet 5 is fixed to the magnet mounting part 72 by bending the projecting stopper piece 72d. In such arrangement, it is certain that replacement of the permanent magnet 5 can be carried out by unbending the bent stopper part 72c or the projecting stopper piece 72d. It is also possible that the permanent magnet 5 is fixed more firmly to the magnet mounting part 72 by application of an adhesive.

(2) In the foregoing Embodiments 1 and 2, although the mounting part 71 of the magnet-holding member 7 is fixed to the claw-shaped magnetic poles 21, 31 by laser welding or projection welding, the way of fixation is not limited to those welding, and it is preferable to employ fixation means such as caulking or adhesion. Caulking will provide simple and less expensive joining. Adhesion will fix firmly the magnet holding member 7 and the pole cores 2, 3 without thermal deformation, resulting in improvement in fatigue strength.

Figure 7:
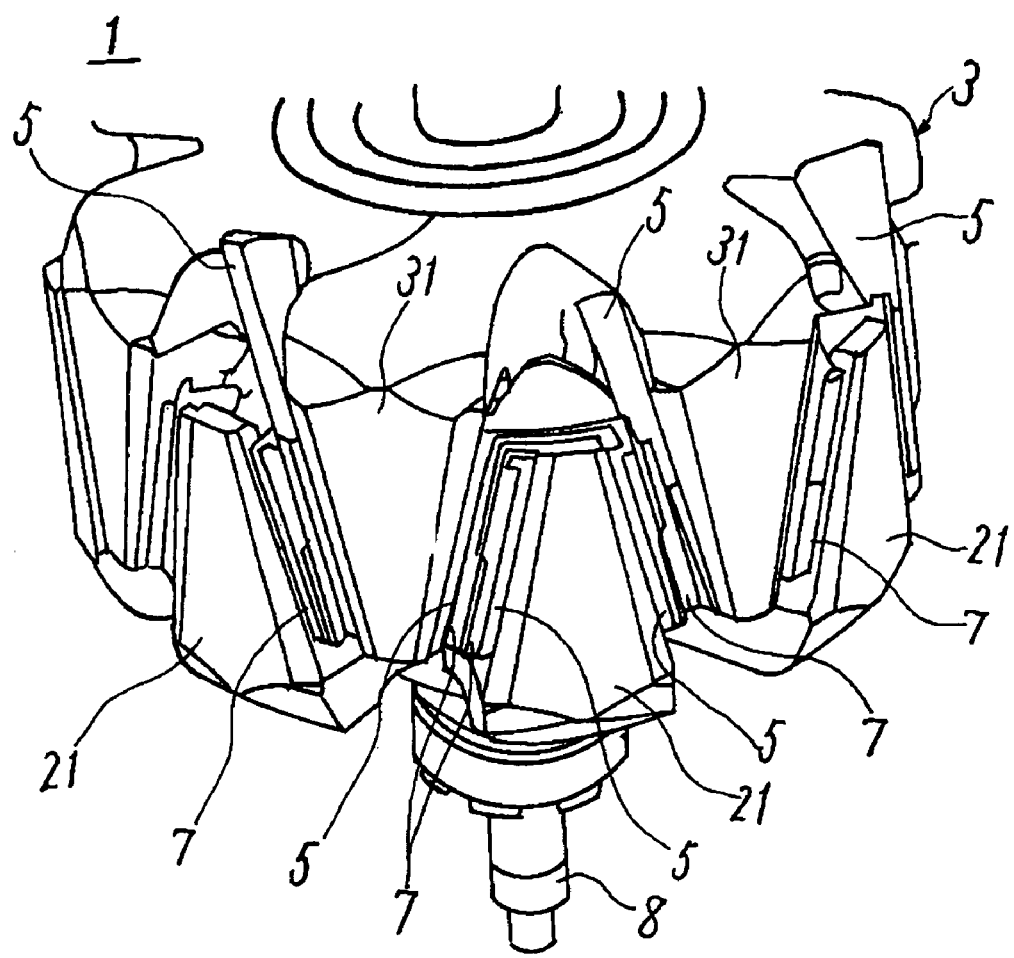
FIG. 7 is a perspective view showing a modification of manufacturing order of a rotor core.

(3) In the manufacturing order of the rotor core 1 of the foregoing Embodiments 1 and 2, although the permanent magnet 5 is mounted on each magnet mounting part 72 of the magnet-holding member 7 before assembling the pole cores 2, 3, it is also preferable to reverse the manufacturing order. For example, as shown in FIG. 7, it is also preferable that the pole cores 2, 3 to which the magnet-holding member 7 is fixed are assembled, and then the permanent magnet 5 is mounted on each magnet mounting part 72 of the magnet-holding member 7.

In this manufacturing process, at the time of assembling the pair of pole cores 2, 3 and at the time of press-fitting the rotary shaft 8 to the rotor core 1 obtained by assembling the pole cores 2, 3, any pressing force is not directly applied to the permanent magnet 5. As a result, the permanent magnet 5 can be exactly prevented from any unexpected sudden damage. Furthermore, it is also possible to reduce the possibility of mixing foreign matters such as chip or powder due to cutting.

What is claimed is:

1. An electric rotating machine comprising a rotor comprising a rotor core and a rotor coil magnetizing said rotor core, said rotor core comprising:
  a plurality of claw-shaped magnetic poles which cover said rotor coil and are oppositely disposed so that a pair of pole cores formed at a predetermined pitch along circumferential direction are engaged with each other; and
  a plurality of magnet-holding members which are separately and directly fixed to each of the claw-shaped magnetic poles of at least one of said pair of pole cores;
wherein each magnet-holding member is provided with a magnet mounting part on which a permanent magnet is mounted on two sides of the claw-shaped magnetic poles in circumferential direction; each magnet mounting part is formed so as to be located between the claw-shaped magnetic poles engaged with each other; and each magnet mounting part includes an extending part extending in a circumferential direction of the rotor core, a holding part extending from the extending part in a radial direction of the rotor core, a stopper part extending in the circumferential direction from the holding part, and a projecting stopper piece extending in the circumferential direction from an axial end of the holding part toward a side face of a corresponding one of the claw-shaped magnetic poles, and
wherein the magnet is fixed on the magnet mounting part by the stopper part or the projecting stopper piece which is formed by bending a part of the magnet-holding member.

2. The electric rotating machine according to claim 1, wherein said magnet-holding members are fixed to each of said claw-shaped magnetic poles of both of said two pole cores.

3. The electric rotating machine according to claim 1, wherein said magnet-holding members are fixed to the claw-shaped magnetic poles by at least one of welding, caulking and adhesion.

4. The electric rotating machine according to claim 1, wherein each of said magnet-holding members is composed of spring steel.

5. The electric rotating machine according to claim 1, wherein the magnet is fixed on the magnet mounting part by the stopper part.

6. The electric rotating machine according to claim 1, wherein the magnet is fixed on the magnet mounting part by the projecting stopper piece.

* * * * *